Aug. 4, 1953     MIHAI ALIMANESTIANO     2,647,647
APPARATUS FOR PARKING AUTOMOBILES

Filed June 3, 1949     5 Sheets-Sheet 1

INVENTOR.
MIHAI ALIMANESTIANO
BY
ATTORNEY

Aug. 4, 1953   MIHAI ALIMANESTIANO   2,647,647
APPARATUS FOR PARKING AUTOMOBILES
Filed June 3, 1949   5 Sheets-Sheet 2

INVENTOR.
MIHAI ALIMANESTIANO
BY
ATTORNEY

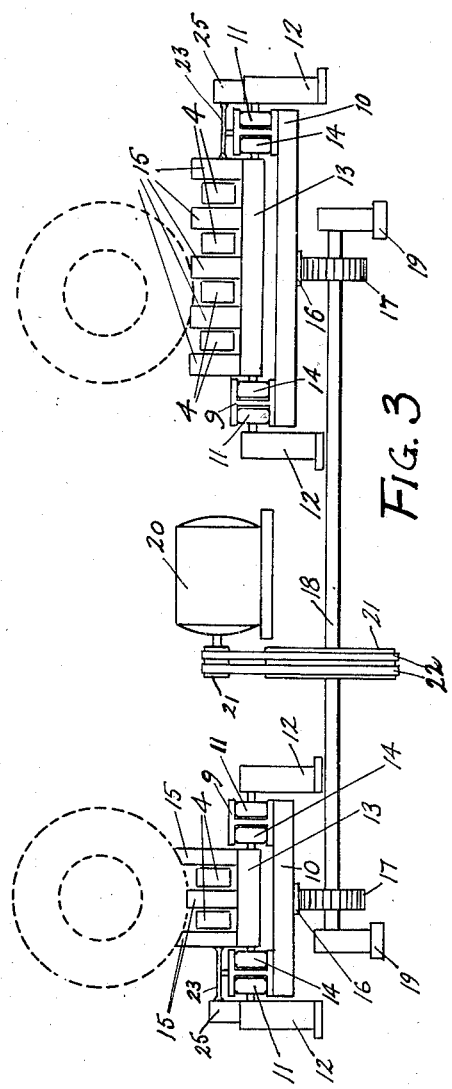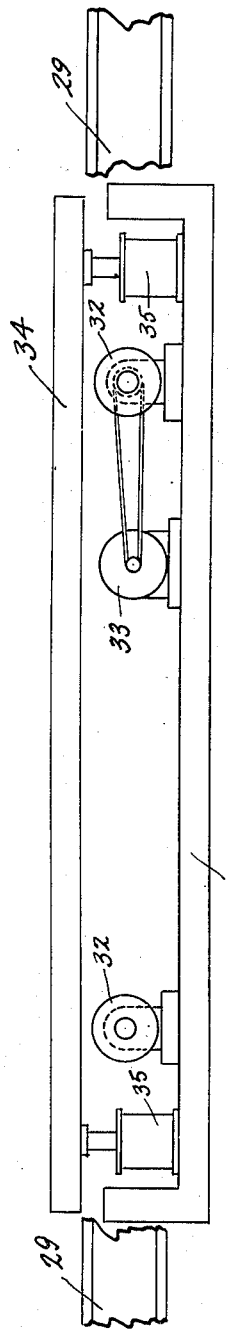

INVENTOR.
MIHAI ALIMANESTIANO

INVENTOR.
MIHAI ALIMANESTIANO
BY
ATTORNEY

Patented Aug. 4, 1953

2,647,647

UNITED STATES PATENT OFFICE 2,647,647

APPARATUS FOR PARKING AUTOMOBILES

Mihai Alimanestiano, Beaumont, Tex., assignor of fifty per cent to Cornelius Kroll, Houston, Tex.

Application June 3, 1949, Serial No. 97,021

19 Claims. (Cl. 214—16.1)

The invention concerns apparatus which is intended more particularly for use in parking automobiles but which is adapted also for use in storing various commodities which may be handled in like manner.

An object of the invention is to permit the parking and storing of a large number of automobiles in a minimum of space, as in cities where parking space is scarce and expensive. The apparatus of the invention enables any space large enough to permit the parking of two automobiles side by side to be converted into a parking place for large numbers of automobiles, parking space being provided either above the surface or below ground or both.

The apparatus of the invention can be used also in cases where a narrow, elongated area is available, the width of the area being sufficient if it is as much as twice the width of the automobiles to be parked.

Another object of the invention is to permit the parking of automobiles with all of the wheels braked, with the doors and windows closed, without using the steering wheel, without touching any side of the automobile and without lifting the weight of the automobile from the wheels.

Another object of the invention is to permit all operations to be performed automatically, using conventional pushbutton controls.

Another object of the invention is to provide apparatus having a smaller number of moving parts and which is therefore less expensive and subject to less wear than apparatus which has been proposed heretofore for this purpose.

Another object of the invention is to reduce construction costs by eliminating floors, ramps, walls and ceilings which are indispensable in conventional garages.

In one embodiment thereof the invention comprises a mast-like structure or tower which includes a steel frame and may or may not be housed in a building. A number of shelf-like units are provided at different elevations within the tower, each unit being adapted to receive an automobile, for example, and a pair of units being provided at each level. The several pairs of shelf-like units are aligned vertically and the two units of each pair are spaced apart to provide an elevator shaft between them. The shelf-like units are supported only at their outer ends and at intermediate points adjacent thereto, leaving the inner ends unobstructed. Each of the shelf-like units comprises a plurality of horizontally extending beams which are spaced apart and adapted to receive between them the beams of a laterally moving conveyor which is carried by the elevator and which also includes a plurality of horizontally extending beams. The weight of the automobile or other commodity may be shifted from the conveyor to the shelf-like unit and back again to the conveyor by moving the elevator vertically.

When it is desired to park an automobile, for example, the elevator is positioned at the level of the automobile, which may or may not be street level, and the automobile is positioned on one of the shelf-like units. The laterally moving conveyor is moved into engagement with the shelf-like unit, the elevator is lifted slightly to transfer the weight of the automobile to the conveyor, and the conveyor is returned to its normal position within the elevator shaft. The elevator is then raised to the desired elevation, the conveyor is again moved into engagement with one of the shelf-like units, and the automobile is lowered onto the shelf-like unit.

In a modified form of the invention several pairs of shelf-like units may be arranged side by side at each elevation. In this embodiment of the invention the conveyor is mounted on a shuttle car which moves transversely with respect to the shelf-like units, the shuttle car being carried by an elevator from one elevation to another.

The invention will be understood by referring to the following description and the accompanying drawing, in which:

Fig. 3 is a sectional view in elevation taken on the line 3—3 of Fig. 2.

Fig. 6 is an enlarged sectional view in elevation showing a part of the apparatus illustrated in Fig. 5.

Figure 1:
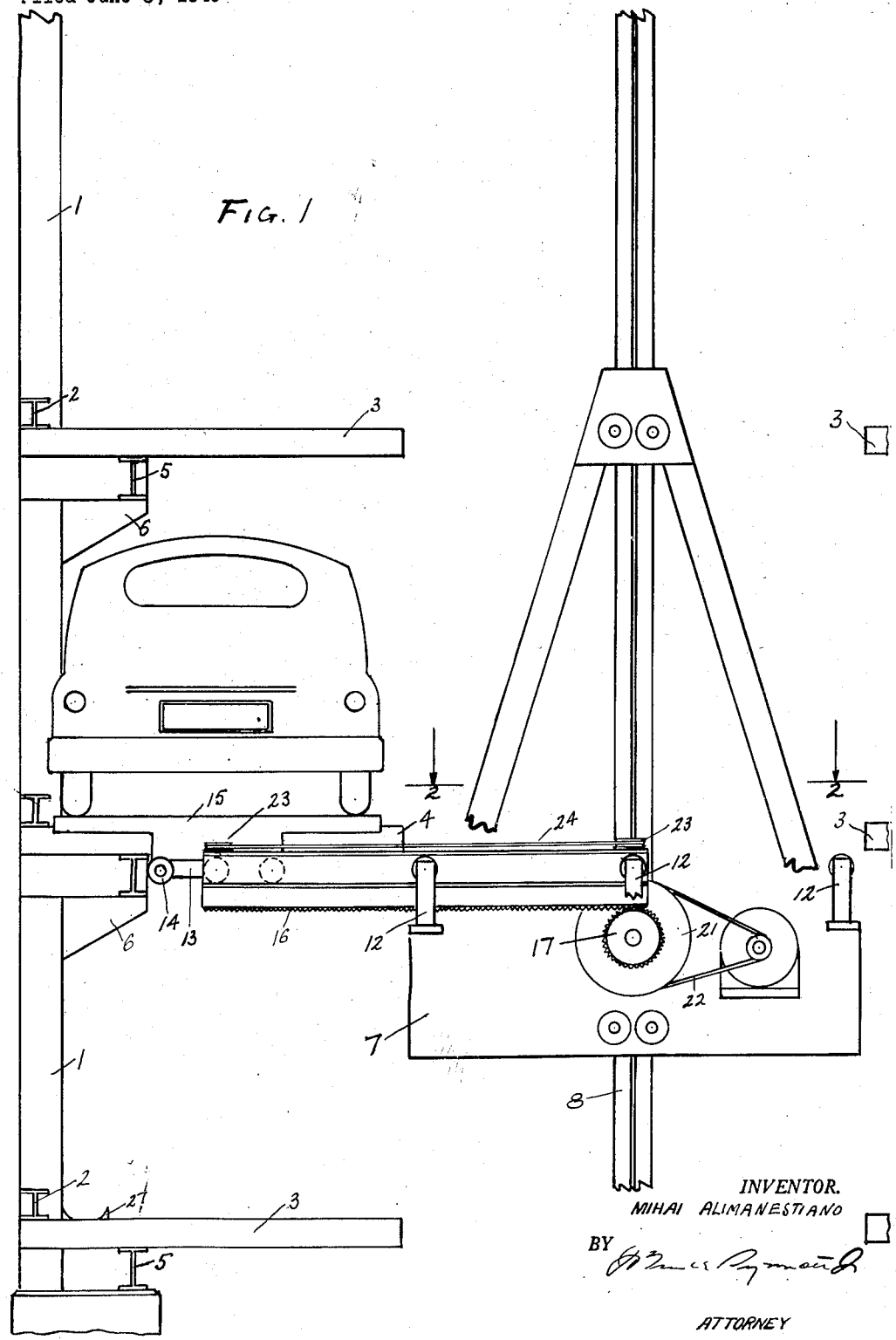
Fig. 1 is a sectional view in elevation illustrating a portion of a structure embodying the invention.
Figure 2:
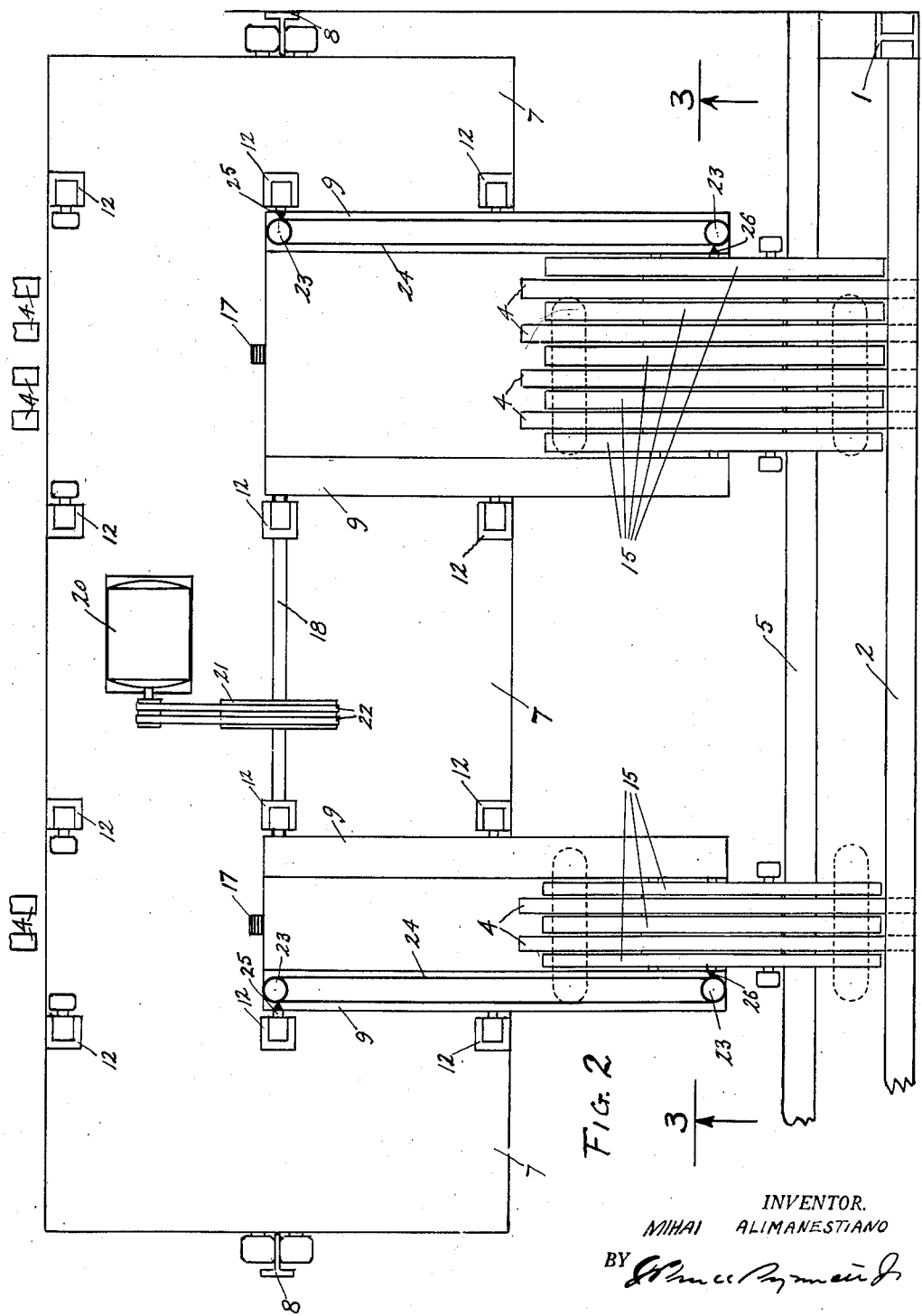
Fig. 2 is a sectional plan view taken on the line 2—2 of Fig. 1.

Referring to the embodiment of the invention illustrated in Figs. 1 to 3, inclusive, the apparatus of the invention includes a structure having a steel frame comprising a plurality of columns 1 and connecting beams 2. A number of shelf-like units 3 are provided at different elevations within the structure, each unit 3 being adapted to receive an automobile, for example, and a pair of units 3, only one of which is shown, being provided at each level. The several pairs of shelf-like units 3 are aligned vertically and the units 3 of each pair are spaced apart to provide an elevator shaft between them. The shelf-like units 3 are supported only at their outer ends and at intermediate points adjacent thereto, leaving the inner ends unobstructed. Each of the shelf-like units 3 comprises a plurality of horizontally extending elongated members or beams 4 which are spaced apart in side by side parallel relation to each other. The beams 4 are supported at their outer ends by the beams 2 and at intermediate points adjacent their outer ends by beams 5 which in turn are supported by brackets 6.

The beams 4 are divided into two groups. One group consists of only two beams so that the wheels at one end of the automobile, say the front end, when resting on this group will divide their load between the two beams and the deformation of the tires will cause them to sink slightly between the two beams below the upper surface thereof to prevent the automobile from rolling or sliding off the beams and to determine a unique position in which the front wheels of the car will come to rest. The other group of beams is disposed at a distance from the first group equal to the length of the wheel base of the average automobile to be parked and this second group has more than two beams so as to accommodate automobiles having wheel base lengths differing slightly from the average.

An elevator 7 is provided, the elevator 7 having a pair of guides 8. A pair of laterally moving conveyors as hereinafter described are carried by the elevator 7. One of the conveyors carries the front wheels of the automobile and the other carries the rear wheels. It will be understood that the two conveyors may be combined and operated as one. Each of the conveyors includes an upper section and a lower section, the upper section being carried by the lower section and being movable with respect thereto. The lower section comprises a pair of beams 9 and connecting beams 10, and is supported for lateral movement on rolls 11 which engage channels formed in one side of the beams 9. The rolls 11 are carried by stationary supports 12 positioned on the elevator 7. The upper section comprises a relatively short frame 13 which is supported for lateral movement on rolls 14 which engage channels formed in the sides of the beams 9 opposite the rolls 11. The upper section also includes a plurality of horizontally extending beams 15 which are spaced apart in parallel relation to each other and are adapted to receive between them the beams 4. As shown in Fig. 1 the beams 15 are considerably longer than the frame 13 and extend outwardly beyond the ends thereof. The frame 13 is necessarily short as it abuts the beams 5 at the end of its lateral movement in each direction.

A rack 16 is secured to the under side of the lower section of each conveyor, the racks 16 being engaged by pinions 17 which are rigidly secured to opposite ends of a shaft 18. The shaft 18 turns in stationary bearings 19 which are mounted on the elevator 7 and is driven by a motor 20 thru speed reducing sheaves 21 and connecting belts 22. By action of the motor 20 and connecting parts the pinions 17 are caused to engage the racks 16 to move the lower sections of the conveyors in either direction.

In order to move the upper sections of the conveyors with respect to the lower sections, pairs of sheaves 23 are mounted horizontally on two of the beams 9. Each pair of sheaves 23 is connected by a belt 24. Th belt 24 is connected at 25 to one of the stationary supports 12, and at 26 the belt 24 is connected to the frame 13. Thus when the lower section of the conveyor is moved laterally in either direction the sheaves 23, acting on the belt 24, cause the upper section of the conveyor to be moved in the same direction but at a faster rate than the lower section.

As shown in Figs. 2 and 3, the width of the two conveyors is sufficient only to support the wheels of an automobile, indicated by the dotted lines.

It is contemplated that the conveyor which supports the front wheels may be relatively narrow, the conveyor supporting the rear wheels being relatively wide in order to support automobiles of different lengths. The three beams 15 supporting the front wheels may be of unequal height from front to rear, as shown in Fig. 3, so as to engage the wheels and prevent them from rolling and to determine a unique position thereof on the conveyor. In this manner, an automobile picked up from a uniquely predetermined position on one of the shelves or self-like units can be placed in a unique predetermined position on the conveyors and then relaced accurately on another shelf in a unique predetermined position. This makes possible the use of a minimum number of beams for the conveyors. The two beams of the front group of each shelf and the three beams of the front conveyor constitute a minimum practical number of co-operating beams for supporting and holding the wheels and transferring the load from shelf to conveyor. The two beams are chosen for the shelves rather than the conveyor because there are many shelves and only one pair of conveyors. The beams 4 and 15 are of unequal height, the upper edges of the beams 15 extending vertically above the upper edges of the beams 4.

A wheel guide 27 is provided along one side of one of the shelf-like units 3 to align the wheels of an automobile when receiving the automobile in the apparatus.

Figure 4:
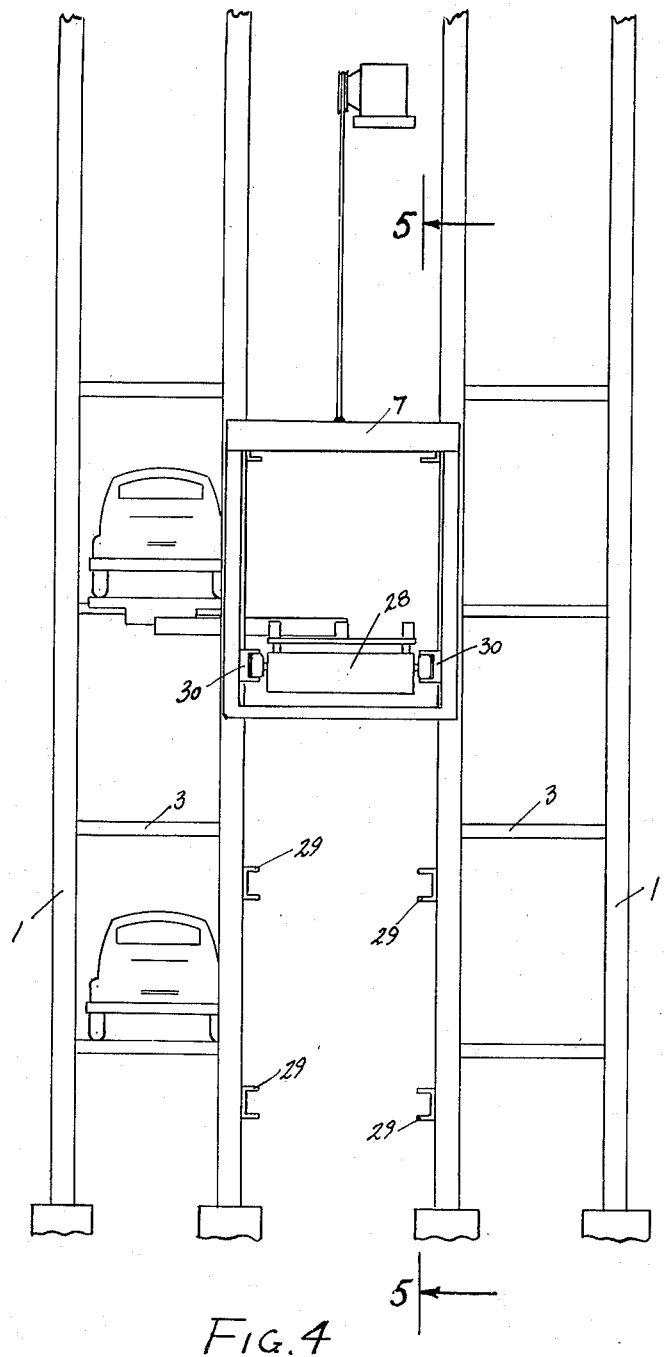
Fig. 4 is a sectional view in elevation illustrating a portion of a structure embodying a modified form of the invention.
Figure 5:
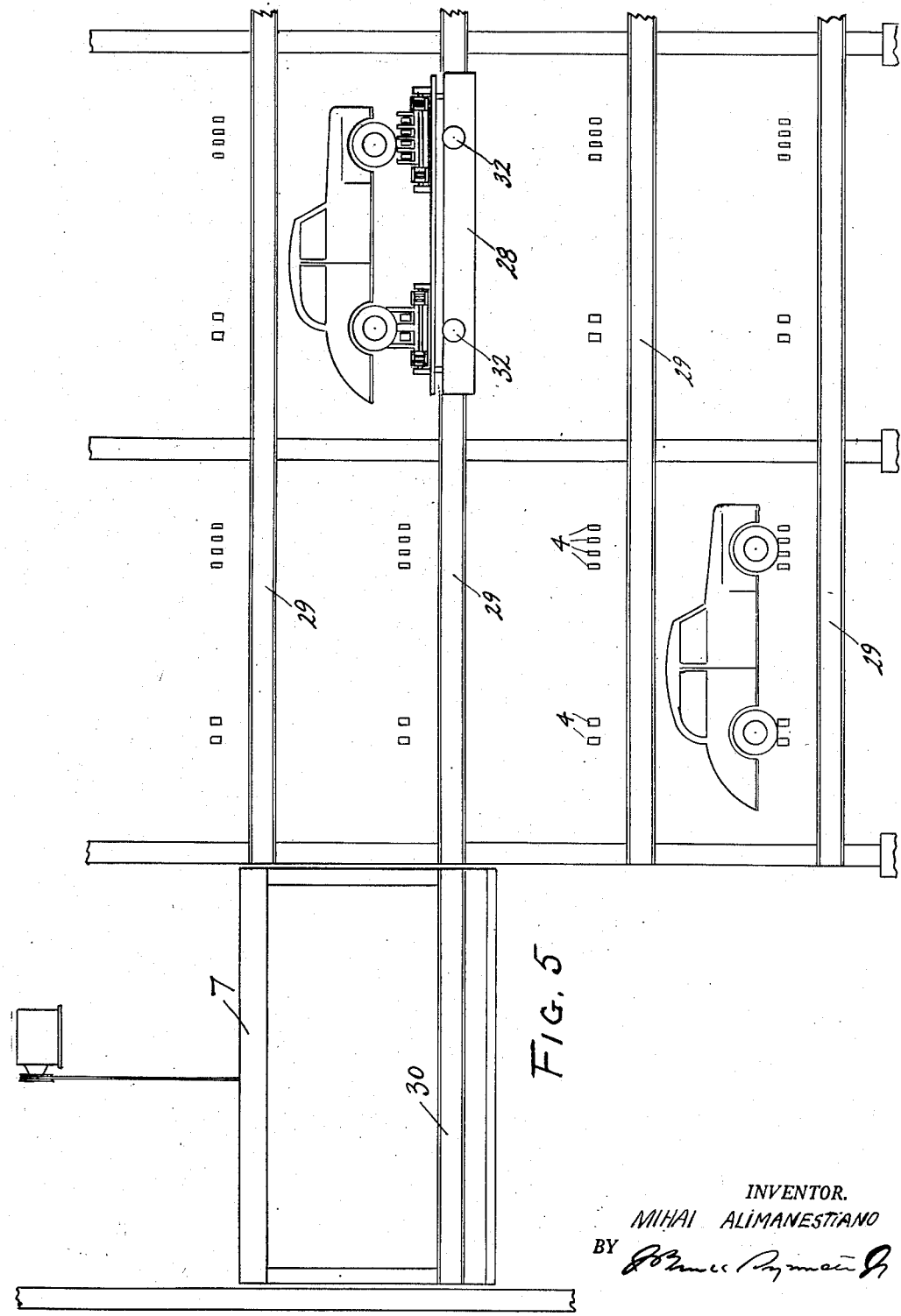
Fig. 5 is a sectional view in elevation taken on the line 5—5 of Fig. 4.

Referring to the modification of the invention illustrated in Figs. 4 to 6, inclusive, several pairs of the shelf-like units 3 are arranged side by side at each elevation. In this embodiment of the invention the conveyors are mounted on a shuttle car 28 which moves transversely with respect to the shelf-like units 3, the shuttle car 28 being carried by the elevator 7 from one elevation to another. Tracks 29 are provided for the shuttle car 28, the tracks 29 being positioned between the tiers of shelf-like units 3 at each elevation. Corresponding tracks 30 are carried by the elevator 7. The tracks 29 and 30 provide means for guiding the shuttle car from the elevator along side of the tiers of shelves.

Referring to Fig. 6, the shuttle car 28 includes an underslung platform 31 which is supported for movement along the tracks 29 and 30 by wheels 32. A motor 33 is provided for driving a pair of the wheels 32. In this embodiment of the invention the conveyors are mounted on a base 34 which in turn is mounted on the shuttle car 28. Hydraulic lifting means 35 is interposed between the conveyor base 34 and the shuttle car platform 31. The conveyor base 34 constitutes a secondary elevator, the car 7 being the primary elevator. The jacks 35 constitute means to raise and lower the secondary elevator while the cable and electric motor shown in Figure 4 connected to elevator car 7 constitute means to raise and lower the primary elevator. The secondary elevator makes it possible to raise and lower the conveyors when the shuttle car is off of the primary elevator. Also it makes it unnecessary to raise and lower the primary elevator to transfer automobiles between the conveyor and the shelves immediately adjacent thereto which are reached by the conveyor while the shuttle car is still on the primary elevator. This results in a saving in power and also an increase in speed since the elimination of the primary elevator from the moving system lowers its inertia.

While in the foregoing description the means carried on the primary elevator for supporting and transferring automobiles has been referred to as a pair of multiple section conveyors, it is equally appropriate to refer to the pair of conveyors together as a single conveyor since as previously mentioned they can be combined into one and are in fact driven by a single motor. It will also be apparent that the upper section or sections of the conveyor or pair of conveyors may be considered to be the conveyor element and the lower section or sections provide a mounting means supporting the conveyor for reciprocation relative to the mounting, the mounting in turn being reciprocably mounted on the primary or secondary elevator. The use of this intermediate mounting means makes it possible to extend the conveyor out over the edge of the elevator beyond the point where there is sufficient overlap to support the conveyor and thus to extend the conveyor fully so that no part of it overlaps the elevator and all of it is in the shelf space. Without it the conveyor would have to be wider than the elevator to provide an overlap to support it from the elevator, and this would necessitate a wider elevator shaft and also would necessitate shelves wider than the automobiles in the case of delivery of automobiles at both sides of the elevator from a single central position of the automobiles on the conveyor. Tying the conveyor beams together underneath by means of frame 13 rather than at the ends thereof also reduces the necessary width of the elevator shaft and also is a necessity for a dual delivery system, that is, one delivering at either side of the elevator without the necessity of placing the automobile at one side of the conveyor.

While a preferred embodiment of the invention has been shown and described, it is obvious that many modifications thereof can be made without departing from the spirit of the invention and it is desired to protect by Letters Patent all forms of the invention falling within the scope of the following claims.

I claim:

1. An apparatus useful for parking automotive vehicles, said apparatus comprising a plurality of shelf-like units positioned at different elevations, the shelf-like units being aligned vertically, each of the shelf-like units comprising a plurality of horizontally extending beams which are spaced apart in parallel relation to each other, an elevator and a conveyor carried by the elevator, the conveyor including an upper section and a lower section, the upper section being carried by the lower section and being movable with respect thereto in a direction parallel to said beams, a rack secured to the lower section, the rack being engaged by a motor actuated pinion to move the lower section in either direction, a pair of sheaves mounted on the lower section and a cable connecting the sheaves, the cable being connected at one point to the elevator and at another point to the upper section so that when the lower section is moved laterally in either direction the sheaves, acting on the cable cause the upper section to be moved in the same direction but at a faster rate than the lower section, the upper section including a plurality of horizontally extending beams which are spaced apart in parallel relation to each other and are adapted to receive between them the beams of the shelf-like units.

2. An apparatus useful for parking automotive vehicles, said apparatus comprising a primary elevator, means to raise and lower the primary elevator, a plurality of superposed vertically spaced shelves disposed with one side of each shelf adjacent one side of the path of the primary elevator, each shelf comprising a plurality of elongated members disposed in spaced side by side relationship running transverse to said one side of the shelf and with the ends of the spaces between said members open at said one side of the shelf, a secondary elevator carried by the primary elevator, means to raise and lower the secondary elevator independent of the means to raise and lower the primary elevator, a conveyor carried by the secondary elevator, said conveyor comprising a plurality of elongated members disposed in spaced side by side relationship and extending in the same direction as said shelf members with the ends of the spaces between said conveyor members open at least at the side of the conveyor adjacent said one side of each shelf, means carried by the secondary elevator mounting said conveyor on said secondary elevator for movement relative to the secondary elevator in the direction of the length of said members between a position in which the conveyor is over the secondary elevator and out of the shelf space and a position in which it is out to the side of the secondary elevator and in the shelf space, said conveyor and shelf members meshing with each other when the conveyor is in the shelf space at the same level as a shelf.

3. An apparatus useful for parking automotive vehicles, said apparatus comprising an elevator movable along a vertical shaftway, means to raise and lower the elevator along said shaftway, a plurality of superposed vertically spaced shelves disposed with one of each shelf adjacent one side of said shaftway, each shelf including a plurality of elongated members disposed in spaced apart side by side relationship running transverse to said one side of the shelf, the ends of the spaces between said members being open at said one side of the shelf, a conveyor carried by the elevator, said conveyor comprising a plurality of elongated members disposed in spaced apart side by side relationship running in the same direction as said shelf members, the ends of the spaces between said conveyor members being open at the side of the conveyor which is adjacent said one side of each shelf, means to move the conveyor in the direction of the length of said conveyor members between a position in which the conveyor is over the elevator and out of the shelf space and a position in which it is out to the side of the elevator and in the shelf space, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, and said portions being located underneath the shelf members when the conveyor is in full mesh with the shelf, the entire tying support means being located beneath the conveyor members, and the conveyor and said entire tying support means being within the length of the elevator in the direction parallel to the lengths of said shelf members when the conveyor is out of the shelf space and over the elevator.

4. An apparatus useful for parking automotive vehicles, said apparatus comprising an elevator movable along a vertical shaftway, means to raise and lower the elevator along said shaftway, a plurality of superposed vertically spaced shelves disposed with one side of each shelf adjacent one side of said shaftway, each shelf including two groups of elongated members, said groups being spaced apart horizontally and the members in each group being disposed in spaced apart side by side relationship running transverse to said one side of the shelf, the ends of the spaces between said members being open at said one side of the shelf, a conveyor carried by the elevator, said conveyor comprising two groups of elongated members, said conveyor groups also being spaced apart horizontally and the elongated members in each conveyor group being disposed in spaced apart side by side relationship and running in the same direction as said shelf members, the ends of the spaces between said conveyor members being open at the side of the conveyor which is adjacent said one side of each shelf, means to move the conveyor in the direction of the length of said conveyor members between a position in which the conveyor is over the elevator and out of the shelf space and a position in which it is out to the side of the elevator and in the shelf space, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, and said portions being located underneath the shelf members when the conveyor is in full mesh with the shelf, the entire tying support means being located beneath the conveyor members, and the conveyor and said entire tying support means being within the length of the elevator in the direction parallel to the lengths of said shelf members when the conveyor is out of the shelf space and over the elevator.

5. An apparatus useful for parking automotive vehicles, said apparatus comprising an elevator movable along a vertical shaftway, means to raise and lower the elevator along said shaftway, a plurality of superposed vertically spaced shelves disposed with one side of each shelf adjacent one side of said shaftway, each shelf including a plurality of elongated members disposed in spaced apart side by side relationship running transverse to said one side of the shelf, the ends of the spaces between said members being open at said one side of the shelf, a conveyor carried by the elevator, said conveyor comprising a plurality of elongated members disposed in spaced apart side by side relationship and running in the same direction as said shelf members, the ends of the spaces between said conveyor members being open at the side of the conveyor which is adjacent said one side of each shelf, support means tying said conveyor members together, said support means being disposed entirely below the upper surface of said conveyor members and including portions which extend transversely of said conveyor members beneath the spaces between said conveyor members, and means to move the conveyor in the direction of the length of said conveyor members between a position in which the conveyor is over the elevator and out of the shelf space and a position in which it is out to the side of the elevator and in the shelf space, said last named means including a movable intermediate carriage located between said conveyor and said elevator, said conveyor being supported by said carriage for reciprocation with respect thereto in a plane parallel to the shelf planes and said carriage being supported on the elevator for reciprocation with respect thereto in a plane parallel to the shelf planes, the conveyor and shelf members meshing with each other when the conveyor is in the shelf space at the same level as a shelf, and said transverse portions of the conveyor support means being located underneath the shelf members when the conveyor is in full mesh with the shelf.

6. An apparatus useful for parking automotive vehicles, said apparatus comprising an elevator movable along a vertical shaftway, means to raise and lower the elevator along said shaftway, a plurality of superposed vertically spaced shelves disposed with one side of each shelf adjacent one side of said shaftway, each shelf including a plurality of elongated members disposed in spaced apart side by side relationship running transverse to said one side of the shelf, the ends of the spaces between said members being open at said one side of the shelf, a conveyor carried by the elevator, said conveyor comprising a plurality of elongated members disposed in spaced apart side by side relationship and running in the same direction as said shelf members, the ends of the spaces between said conveyor members being open at the side of the conveyor which is adjacent said one side of each shelf, support means tying said conveyor members together, said support means being disposed entirely below the upper surface of said conveyor members and including portions which extend transversely of said conveyor members beneath the spaces between said conveyor members, and means to move the conveyor in the direction of the length of said conveyor members between a position in which the conveyor is over the elevator and out of the shelf space and a position in which it is out to the side of the elevator and in the shelf space, the conveyor and shelf members meshing with each other when the conveyor is in the shelf space at the same level as a shelf, and said transverse portions of the conveyor support means being located underneath the shelf members when the conveyor is in full mesh with the shelf, said conveyor moving means including a movable intermediate carriage located between said conveyor and said elevator, said conveyor being supported by said carriage for reciprocation with respect thereto in a plane parallel to the shelf planes and said carriage being supported on the elevator for reciprocation with respect thereto in a plane parallel to the shelf planes, and means connecting said conveyor to said carriage to cause the conveyor to be moved in the same direction as the carriage but at a faster rate than the carriage.

7. An apparatus useful for parking automotive vehicles, said apparatus comprising an elevator movable along a vertical shaftway, means to raise and lower the elevator along said shaftway, two sets of superposed vertically spaced shelves disposed with one side of each shelf in one set adjacent one side of said elevator shaftway and with one side of each shelf in the other set adjacent an opposite side of said elevator shaftway, each shelf including a plurality of spaced apart parallel elongated members running transverse to said one side of the shelf, the ends of the spaces between the members being open at said one side of the shelf, a conveyor carried by the elevator, said conveyor comprising a plurality of spaced apart parallel elongated members parallel to said shelf members, the ends of the spaces between said conveyor members being open at both ends of the conveyor and said spaces being unobstructed throughout the length of said conveyor members, means to move the conveyor in a direction parallel to the length of said conveyor members between a position in which the conveyor is over the elevator and out of the shelf spaces and positions in which the conveyor is out at either side of the elevator and in the shelf space on that side, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, said portions being located underneath the shelf members when the conveyor is in full mesh with the shelf.

8. An apparatus useful for parking automotive vehicles, said apparatus comprising an elevator movable along a vertical shaftway, means to raise and lower the elevator along the shaftway, two sets of superposed vertically spaced shelves disposed with one side of each shelf in one set adjacent one side of said elevator shaftway and with one side of each shelf in the other set adjacent an opposite side of said elevator shaftway, each shelf including a plurality of spaced apart parallel elongated members running transverse to said one side of the shelf, the ends of the spaces between the members being open at said one side of the shelf, a conveyor carried by the elevator, said conveyor comprising a plurality of spaced apart parallel elongated members parallel to said shelf members, the ends of the spaces between said conveyor members being open at both ends of the conveyor and said spaces being unobstructed throughout the length of said conveyor members, means to move the conveyor in a direction parallel to the length of said conveyor members between a position in which the conveyor is over the elevator and out of the shelf spaces and positions in which the conveyor is out at either side of the elevator and in the shelf space on that side, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, said portions being located underneath the shelf members when the conveyor is in full mesh with the shelf, the width of said elevator shaftway being predetermined to a minimum adequate to permit an automotive vehicle to be moved vertically up and down said shaftway between said sets of shelves, and the length of each shelf, in a direction parallel to the shelf members, being substantially equal to said shaftway width whereby the total distance made up of twice the length of a shelf plus the shaftway width is kept to a minimum in order to conserve ground space.

9. An apparatus useful for parking automotive vehicles, said apparatus comprising an elevator movable along a vertical shaftway, means to raise and lower the elevator along said shaftway, two sets of superposed vertically spaced shelves disposed with one side of each shelf in one set adjacent one side of said elevator shaftway and with one side of each shelf in the other set adjacent an opposite side of said elevator shaftway, each shelf including a plurality of spaced apart parallel elongated members running transverse to said one side of the shelf, the ends of the spaces between the members being open at said one side of the shelf, a conveyor carried by the elevator, said conveyor comprising a plurality of spaced apart parallel elongated members parallel to said shelf members, the ends of the spaces between said conveyor members being open at both ends of the conveyor and said spaces being unobstructed throughout the length of said conveyor members, means to move the conveyor in a direction parallel to the length of said conveyor members between a position in which the conveyor is over the elevator and out of the shelf spaces and positions in which the conveyor is out at either side of the elevator and in the shelf space on that side, said conveyor and shelf members meshing with each other when the conveyor is in the shelf space at the same level as a shelf, support means tying said conveyor members together, said support means being disposed entirely below the upper surface of said conveyor members and extending transversely of said members and also being centered lengthwise with respect to said conveyor members whereby the conveyor members overhang the support means at each side of the conveyor, and a shelf support means located beneath and extending transversely with respect to the shelf members of each shelf, said shelf members overhanging said shelf support means a distance substantially equal to at least twice the amount by which the conveyor members overhang the conveyor support means at one side of the conveyor whereby, when the conveyor is in mesh with a shelf the conveyor support means and the shelf support means are adjacent.

10. An apparatus useful for parking automotive vehicles, said apparatus comprising an elevator movable along a vertical shaftway, means to raise and lower the elevator along said shaftway, two sets of superposed vertically spaced shelves disposed with one side of each shelf in one set adjacent one side of said elevator shaftway and with one side of each shelf in the other set adjacent an opposite side of said elevator shaftway, each shelf including a plurality of spaced apart parallel elongated members running transverse to said one side of the shelf, the ends of the spaces between the members being open at said one side of the shelf, a conveyor carried by the elevator, said conveyor comprising a plurality of spaced apart parallel elongated members parallel to said shelf members, the ends of the spaces between said conveyor members being open at both ends of the conveyor and said spaces being unobstructed throughout the length of said conveyor members, means to move the conveyor in a direction parallel to the length of said conveyor members between a position in which the conveyor is over the elevator and out of the shelf spaces and positions in which the conveyor is out at either side of the elevator and in the shelf space on that side, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, said portions being located underneath the shelf members when the conveyor is in full mesh with the shelf, and said conveyor moving means including a movable intermediate carriage located between said conveyor and said elevator, said conveyor being supported by said carriage for reciprocation with respect thereto in a plane parallel to the shelf planes and said carriage being supported on the elevator for reciprocation with respect thereto in a plane parallel to the shelf planes.

11. An apparatus useful for parking automotive vehicles, said apparatus comprising a primary elevator movable along a vertical shaftway, means to raise and lower the primary elevator along said shaftway, a plurality of superposed vertically spaced tiers of shelves, guide means extending from adjacent one side of said elevator shaftway along each tier adjacent one side of each of the shelves in the tier, each shelf comprising a plurality of elongated members disposed in spaced side by side relationship running transverse to said one side of the shelf and with the spaces between said members being open at said one side of the shelf, guide means carried by the primary elevator extending to the side of the primary elevator adjacent said one side of the elevator shaftway and disposed to register with the guide means in any tier when at the same level, a shuttle car adapted to travel along both the first and last said guide means and from one to the other when said guide means are at the same level, a secondary elevator carried by the shuttle car, means to raise and lower the secondary elevator relative to the shuttle car, a conveyor carried by the secondary elevator, said conveyor comprising a plurality of elongated members disposed in spaced side by side relationship running transverse to the line of travel of said shuttle car with the ends of the spaces between said conveyor members being open at the side of the conveyor adjacent said one side of each shelf, means carried by the secondary elevator mounting said conveyor on said secondary elevator for movement relative to the secondary elevator in the direction of the length of said conveyor members between a position in which the conveyor is over the secondary elevator and out of the shelf space and a position in which it is out to the side of the secondary elevator and in the shelf space whereby, during the parking of an automotive vehicle, the vehicle is moved to one side of the path of movement of the shuttle car, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, and said portions being located underneath the shelf members when the conveyor is in mesh with a shelf.

12. An apparatus useful for parking automotive vehicles, said apparatus comprising a primary elevator movable along a vertical shaftway, means to raise and lower the primary elevator along said shaftway, a plurality of superposed vertically spaced tiers of shelves, guide means extending from adjacent one side of said elevator shaftway along each tier adjacent one side of each of the shelves in the tier, each shelf comprising a plurality of elongated members disposed in spaced side by side relationship, guide means carried by the primary elevator extending to the side of the primary elevator adjacent said one side of the elevator shaftway and disposed to register with the guide means in any tier when at the same level, a shuttle car adapted to travel along both the first and last said guide means and from one to the other when said guide means are at the same level, a secondary elevator carried by the shuttle car, means to raise and lower the secondary elevator relative to the shuttle car, a conveyor comprising a plurality of elongated members disposed in spaced side by side relationship adapted to mesh with the elongated members of the shelves, and means carried by the secondary elevator to move the conveyor between a position in which the conveyor is over the secondary elevator and out of the shelf space and a position in which the conveyor is out of the side of the secondary elevator and in the shelf space whereby, during the parking of an automotive vehicle, the vehicle is moved to one side of the path of movement of the shuttle car, the conveyor moving means including a movable intermediate carriage located between said conveyor and said secondary elevator, said conveyor being supported by said carriage for reciprocation with respect thereto in a plane parallel to the shelf planes and said carriage being supported on the secondary elevator for reciprocation with respect thereto in a plane parallel to the shelf planes.

13. An apparatus useful for parking automotive vehicles, said apparatus comprising an elevator movable along a vertical shaftway, means to raise and lower the elevator along said shaftway, two sets of superposed vertically spaced shelves disposed with one side of each shelf in one set adjacent one side of said elevator shaftway and with one side of each shelf in the other set adjacent an opposite side of said elevator shaftway, each shelf including a plurality of spaced apart parallel elongated members running transverse to said one side of the shelf, the ends of the spaces between the members being open at said one side of the shelf, a conveyor, means to carry the conveyor on the elevator, said conveyor comprising a plurality of spaced apart parallel elongated members, the ends of the spaces between said conveyor members being open at both ends of the conveyor and said spaces being unobstructed throughout the length of said conveyor members, means to move the conveyor in a direction parallel to the length of said shelf members between a position in which the conveyor is over the elevator and out of the shelf spaces and positions in which the conveyor is out at either side of the elevator and in the shelf space on that side, said conveyor and shelf members being parallel and meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, said portions being located underneath the shelf members when the conveyor is in full mesh with the shelf, the entire tying support means being located beneath the level of the lowermost intermeshing portions of the conveyor members, and the conveyor and said entire tying support means being within the length of the elevator shaftway in the direction parallel to the lengths of said shelf members when the conveyor is out of the shelf space and over the elevator.

14. An apparatus useful for parking automotive vehicles, said apparatus comprising an elevator movable along a vertical shaftway, means to raise and lower the elevator along said shaftway, two sets of superposed vertically spaced shelves disposed with one side of each shelf in one set adjacent one side of the elevator shaftway and with one side of each shelf in the other set adjacent an opposite side of said elevator shaftway, each shelf including a plurality of spaced apart parallel elongated members running transverse to said one side of the shelf, the ends of the spaces between the members being open at said one side of the shelf, a conveyor, means to carry the conveyor on the elevator, means to raise and lower the conveyor relative to the elevator, said conveyor comprising a plurality of spaced apart parallel elongated members, the ends of the spaces between said conveyor members being open at both ends of the conveyor and said spaces being unobstructed throughout the length of said conveyor members, means to move the conveyor in a direction parallel to the length of said shelf members between a position in which the conveyor is over the elevator and out of the shelf spaces and positions in which the conveyor is out at either side of the elevator and in the shelf space on that side, said conveyor and shelf members being parallel and meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, said portions being located underneath the shelf members when the conveyor is in full mesh with the shelf.

15. An apparatus useful for parking automotive vehicles, said apparatus comprising an elevator movable along a vertical shaftway, means to raise and lower the elevator along said shaftway, two sets of superposed vertically spaced shelves disposed with one side of each shelf in one set adjacent one side of said elevator shaftway and with one side of each shelf in the other set adjacent an opposite side of said elevator shaftway, each shelf including a plurality of spaced apart parallel elongated members running transverse to said one side of the shelf, the ends of the spaces between the members being open at said one side of the shelf, a conveyor, means to carry the conveyor on the elevator, means to raise and lower the conveyor relative to the elevator, said conveyor comprising a plurality of spaced apart parallel elongated members, the ends of the spaces between said conveyor members being open at both ends of the conveyor and said spaces being unobstructed throughout the length of said conveyor members, means to move the conveyor in a direction parallel to the length of said conveyor members between a position in which the conveyor is over the elevator and out of the shelf spaces and positions in which the conveyor is out at either side of the elevator and in the shelf space on that side, said conveyor and shelf members being parallel and meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, said portions being located underneath the shelf members when the conveyor is in full mesh with the shelf, the entire tying support means being located beneath the level of the lowermost intermeshing portions of the conveyor members, and the conveyor and said entire tying support means being within the length of the elevator shaftway in the direction parallel to the length of said conveyor members when the conveyor is out of the shelf space and over the elevator.

16. An apparatus useful for parking automotive vehicles, said apparatus comprising a primary elevator movable along a vertical shaftway, means to raise and lower the primary elevator along said shaftway, a first set of superposed vertically spaced tiers of shelves, guide means extending from adjacent one side of said elevator shaftway along each tier adjacent one side of the shelves in the tier, a second set of superposed vertically spaced tiers of shelves on the opposite side of said guide means from said first set of tiers of shelves with one side of each shelf in the second set of tiers adjacent said guide means, each shelf comprising a plurality of spaced apart parallel elongated members running transverse to said one side of the shelf, the ends of the spaces between the members being open at said one side of the shelf, guide means carried by the primary elevator extending to the side of the primary elevator adjacent said one side of the elevator shaftway and disposed to register with the guide means in any tier when at the same level, a shuttle car adapted to travel along both the first and last said guide means and from one to the other when said guide means are at the same level, a conveyor, means to carry the conveyor on the shuttle car, means including a secondary elevator to raise and lower the conveyor relative to the shuttle car, said conveyor comprising a plurality of spaced apart parallel elongated members adapted to mesh with the elongated members of the shelves, the ends of the spaces between said conveyor members being open at both ends of the conveyor and said spaces being unobstructed throughout the length of said conveyor members, means to move the conveyor in a direction parallel to the length of said shelf members between a position in which the conveyor is over the shuttle car and out of the shelf spaces and positions in which the conveyor is out at either side of the shuttle car and in the shelf space on that side, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, said portions being located underneath the shelf members when the conveyor is in full mesh with the shelf, whereby during the parking of an automotive vehicle the vehicle is moved to one side of the path of movement of the shuttle car.

17. An apparatus useful for parking automotive vehicles, said apparatus comprising a plurality of shelf-like units positioned at different elevations, the shelf-like units being aligned vertically, each of the shelf-like units comprising a plurality of horizontally extending beams which are spaced apart in parallel relation to each other, an elevator, and a conveyor carried by the elevator, the conveyor comprising one portion for supporting the front wheels of an automotive vehicle and another portion for supporting the rear wheels of an automotive vehicle, each portion of the conveyor including an upper section and a lower section with the upper section being carried by the lower section and being movable with respect thereto in a direction parallel to said beams, a rack secured to each of the lower sections, each of the racks being engaged by a motor actuated pinion to move the respective lower section in either direction, two pairs of sheaves mounted one pair on each of the lower sections, four cable portions each passing around one of the sheaves, each of the cable portions being connected at one point to the elevator and at another point to the upper section, so that when the lower sections are moved laterally in either direction the sheaves, acting on the cable portions, cause the upper sections to be moved in the same direction but at a faster rate than the lower sections, each of the upper sections including a plurality of horizontally extending beams which are spaced apart in parallel relation to each other and are adapted to receive between them the beams of the shelf-like units.

18. An apparatus useful for parking automotive vehicles, said apparatus comprising a plurality of shelf-like units positioned at different elevations, the shelf-like units being aligned vertically, each of the shelf-like units comprising a plurality of horizontally extending beams which are spaced apart in parallel relation to each other, a primary elevator, a secondary elevator carried by the primary elevator, and a conveyor carried by the secondary elevator, the conveyor comprising one portion for supporting the front wheels of an automotive vehicle and another portion for supporting the rear wheels of an automotive vehicle, each portion of the conveyor including an upper section and a lower section with the upper section being carried by the lower section and being movable with respect thereto in a direction parallel to said beams, a rack secured to each of the lower sections, each of the racks being engaged by a motor actuated pinion to move the respective lower section in either direction, two pairs of sheaves mounted one pair on each of the lower sections, four cable portions each passing around one of the sheaves, each of the cable portions being connected at one point to the secondary elevator and at another point to the upper section, so that when the lower sections are moved laterally in either direction the sheaves, acting on the cable portions, cause the upper sections to be moved in the same direction but at a faster rate than the lower sections, each of the upper sections including a plurality of horizontally extending beams which are spaced apart in parallel relation to each other and are adapted to receive between them the beams of the shelf-like units.

19. An apparatus useful for parking automotive vehicles, said apparatus comprising an elevator movable along a vertical shaftway, means to raise and lower the elevator along said shaftway, a plurality of superposed vertically spaced shelves disposed with one side of each shelf adjacent one side of said shaftway, each shelf including a plurality of elongated members disposed in spaced apart side by side relationship running transverse to said one side of the shelf, the ends of the spaces between said members being open at said one side of the shelf, a conveyor carried by the elevator, means to raise and lower the conveyor relative to the elevator, said conveyor comprising a plurality of elongated members disposed in spaced apart side by side relationship running in the same direction as said shelf members, the ends of the spaces between said conveyor members being open at the side of the conveyor which is adjacent said one side of each shelf, means to move the conveyor in the direction of the length of said conveyor members between a position in which the conveyor is over the elevator and out of the shelf space and a position in which it is out to the side of the elevator and in the shelf space, said conveyor and shelf members meshing with each other when the conveyor is in the shelf space at the same level as a shelf, and support means tying said conveyor members together, said support means including portions located directly beneath the spaces between said conveyor members, each of said portions having an upper surface located beneath the upper surface of the conveyor members a distance greater than the vertical thickness of that part of the shelf members which meshes with the conveyor members, and said portions being located underneath the shelf members when the conveyor is in full mesh with the shelf, the entire tying support means being located beneath the conveyor members, and the conveyor and said entire tying support means being within the length of the elevator in the direction parallel to the lengths of said shelf members when the conveyor is out of the shelf space and over the elevator.

MIHAI ALIMANESTIANO.

References Cited in the file of this patent

UNITED STATES PATENTS

| Number | Name | Date |
|---|---|---|
| 493,542 | Bessing et al. | Mar. 14, 1893 |
| 2,014,351 | Becker | Sept. 10, 1935 |
| 2,018,360 | Heintges | Oct. 22, 1935 |
| 2,478,658 | Harbers | Aug. 9, 1949 |

FOREIGN PATENTS

| Number | Country | Date |
|---|---|---|
| 690,736 | France | Sept. 25, 1930 |
| 337,726 | Great Britain | Oct. 28, 1930 |